UNITED STATES PATENT OFFICE 2,662,848

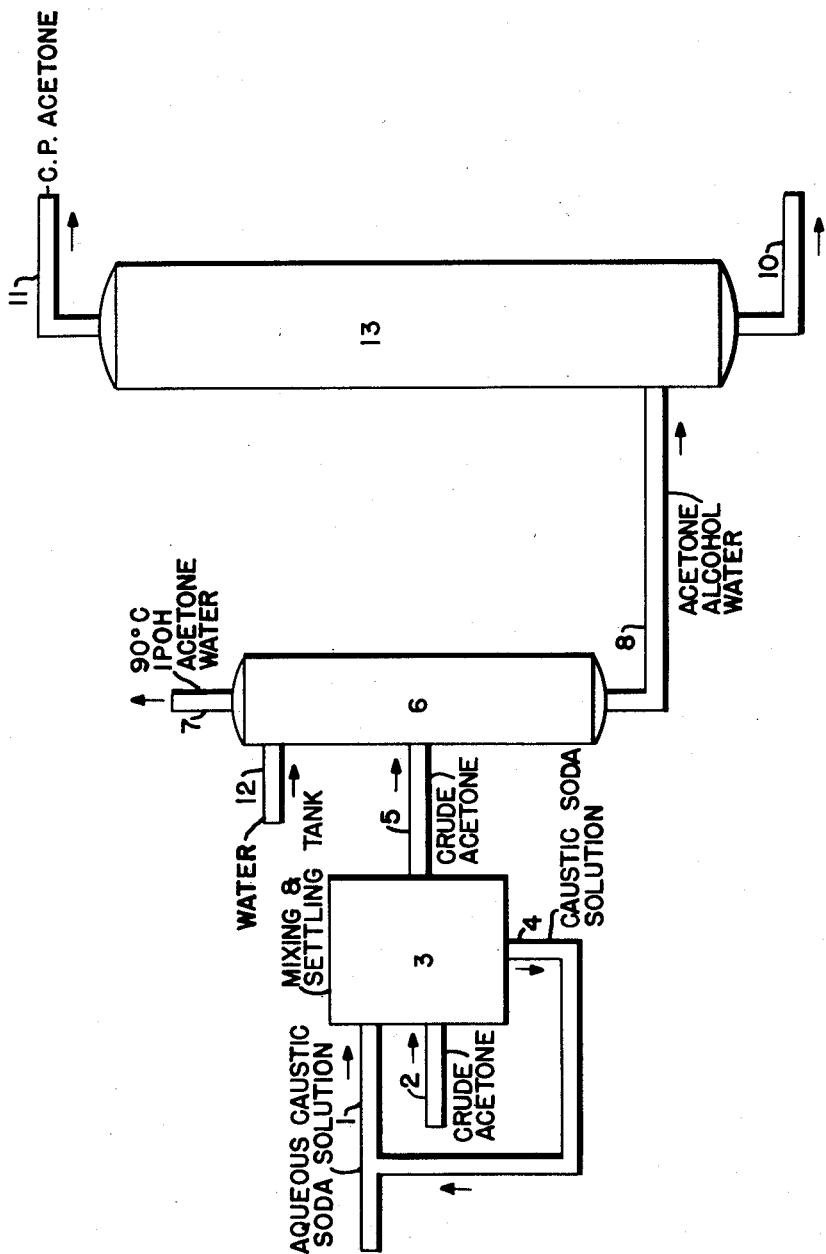

EXTRACTIVE DISTILLATION PURIFICATION OF ACETONE

William G. Emerson, Jr., Somerville, and Joseph R. Quelly, Union, N. J., assignors to Standard Oil Development Company, a corporation of Delaware Application September 8, 1952, Serial No. 308,484

4 Claims. (Cl. 202—39.5)

This invention relates to an improved method of purifying crude acetone. More particularly, it relates to a method of purifying crude acetone containing small but significant quantities of mesityl oxide and aldehyde impurities.

Crude acetone prepared by catalytic processes contains acetone, water, and small quantities of other lower and higher boiling carbonyl impurities, including mesityl oxide and aldehyde impurities, i. e., propion- and acetaldehyde. These impurities, especially the mesityl oxide and aldehyde ones, though present in small quantities, are extremely difficult to remove by conventional means of fractionation. They cause the product to have a low permanganate test time and contain more than 0.005 weight per cent aldehydes calculated as formaldehyde. The product is consequently unsatisfactory because:

1. Acetone with an objectionable odor is not suited for use in paint and varnish removers; preparing coated fabrics; manufacture of paints, varnishes, and lacquers.
2. The presence of aldehydes and other substances which reduce permanganate time of acetone renders this material unsuitable for use in manufacturing photographic films.
3. Acetone containing aldehydes is unsuitable for use in the production of penicillin.

(Chemically pure acetone is defined as having a boiling range between 56°–58° C. and a permanganate test time of at least thirty minutes and less than 0.005% aldehydes as formaldehyde.)

As stated above, conventional fractionation to purify the crude acetone suffers from distinct difficulties, i. e., the high expense because of high reflux ratios required and low yields of product meeting the desired specification for chemically pure acetone.

Purification by "water extractive distillation" also presents certain difficulties. Thus, in order to obtain maximum yield of C. P. acetone from a given crude by this manner of distillation it is necessary to use a volumetric solvent to feed ratio of 17.5 to 1. This makes the process extremely expensive, in terms of both utilities and equipment.

This invention provides an improved method of purifying the crude acetone. The method comprises caustic treating the crude acetone under carefully controlled conditions followed by fractionally distilling the caustic treated acetone in a distillation zone wherein water is added above the caustic treated crude acetone feed point. The conditions of the latter distillation are also carefully controlled.

The crude acetone feed of this invention contains predominantly acetone, i. e., 70–90 weight per cent and usually 80–90 weight per cent, and minor proportions of water, mesityl oxide, and aldehydes. As explained above, the mesityl oxide and aldehyde impurities, even though present in very small quantities, account for the greatest difficulty in the acetone purification. A typical feed analysis is listed below in Table 1.

TABLE 1

86.8 weight per cent acetone
2.3 weight per cent water
0.5 weight per cent mesityl oxide and aldehyde impurities
10.3 weight per cent isopropanol.

The caustic treat, i. e., with aqueous sodium hydroxide or potassium hydroxide, is carried out under the following conditions:

Weight percent hydroxide in water____ 20–50.
Preferred treating time_____ 15 minutes to 3 hours.
Temperature_____ Atmospheric, i. e., about 15°–33° C.
Ratio of aqueous caustic/feed v./v_____ 2/1–1/10.

These conditions have been found to be quite critical. If the concentration of caustic is too high or the contact time is too long, the acetone will condense to form mesityl oxide, and diacetone alcohol with a corresponding decrease in yield. This is shown in Table 2 below. If the ratio of crude acetone to aqueous caustic solution is too high, the yield of C. P. acetone will be low. This is shown in Table 3 below.

TABLE 2

| Treat, weight percent NaOH | Contact time (hrs.) | Volumetric ratio crude acetone to aqueous caustic solution | Vol. percent acetone lost |
|---|---|---|---|
| 45 | 18 | 1:1 | 5.3 |
| 45 | 3 | 1:1 | 3.0 |
| 45 | ½ | 1:1 | 2.9 |
| 40 | ½ | 1:1 | 1.8 |
| 35 | ½ | 1:1 | 1.1 |

TABLE 3

*Effect of volume of 35% caustic used in pre-treat upon yield of C. P. acetone*

| Pre-treat | | | Extractive distillation column | | | | | Product column | | C. P. acetone yield based on that of acetone in crude |
|---|---|---|---|---|---|---|---|---|---|---|
| NaOH solution | Contact time | Vol. ratio caustic solution to feed | Solvent | Vol. ratio solvent to feed ratio | Heads cut, vol. percent of feed | No. of plates | Ext. reflux ratio | Plates | Ext. reflux ratio | |
| 35% | ½ hour | 1:1 | Tap water | 5.0:1 | 3.0 | 55 | 0:1 | 70 | 8:1 | 94.3 |
| 35% | do | 1:2 | do | 5.2:1 | 3.1 | 55 | 0:1 | 70 | 8:1 | 96.9 |
| 35% | do | 1:9 | do | 5.2:1 | 3.0 | 55 | 0:1 | 70 | 8:1 | 80.2 |

The specified distillation in the presence of water is also carried out under well-defined conditions:

Ratio of water/feed v./v..... 2–8/1.
Overhead fraction........... 2–10 volume per cent organics based on the organics originally present in the feed.
Pressure................... Atmospheric.

This invention will be better understood by reference to the flow diagram shown in the drawing.

In the system shown aqueous 35 weight per cent sodium hydroxide solution flows through line 1 into mixing and settling tank 3. Crude acetone in a volume equal to twice the volume of the aqueous caustic enters tank 3 through line 2. The two liquid systems are intimately contacted in tank 3 and allowed to settle into an upper organic phase and a lower aqueous caustic phase. The latter is withdrawn from tank 3 through line 4 and recycled to line 1. Experimental data indicate that the predominant proportion of the undesirable carbonyl impurities is not removed with the caustic by line 4, but rather converted to a form which can be readily removed in the subsequent distillation. The carbonyl impurities are apparently converted to higher molecular weight products which are more easily ejected overhead in the subsequent distillation.

The separated organic crude caustic treated acetone phase may be preheated if desired to below its boiling point, e. g., to a temperature of 56° C., and is fed through line 5, into fractional distillation zone 6. The water concentration of 5 to 1 is effected by introduction of water into an upper portion of tower 6 through line 12, which is above feed point 5. The water consti-tutes an internal liquid reflux ascending countercurrently through the vapors undergoing rectification at an upper part of the tower. The vapors passing overhead through line 7 at a temperature of about 90° C. include in this "head cut" 2 to 10 volume per cent organics based on the organics in the crude acetone feed. This cut therefore contains substantially all the mesityl oxide, some acetone, substantially all the aldehydes, and some alcohol. It is mostly water, containing 5 to 6 volume per cent organics. The temperature in the intermediate portion of the tower is about 74° C. and about 80.9° C. at the lower portion. The bottoms withdrawn from tower 6 through line 8 contains acetone, alcohol and water, and is passed to a second fractionation tower 13. C. P. acetone is taken overhead through line 11 at a vapor temperature of 56°–58° C. (may go up to about 65° C.). The alcohol and water are withdrawn from tower 13 through line 10.

The following examples further point out the advantages of this invention.

EXAMPLE I

A comparison was made of conventional distillation, "water extractive distillation" and the combination process of this invention in the purification of crude acetone. The results are tabulated below in Table 4.

TABLE 4

*Comparison of caustic pre-treat water extractive distillation with conventional distillation and with water extractive distillation for purification of acetone*

| Pre-treat | | | Heads column extractive distillation | | | | | Product column | | C. P. acetone yield—weight percent based on weight of acetone in feed | |
|---|---|---|---|---|---|---|---|---|---|---|---|
| Solution | Contact time | Vol. ratio soda to feed | Solvent | Vol. ratio solvent to feed | Heads cut, vol. percent of feed | No. of plates | Ext. reflux ratio | No. of plates | Ext. reflux ratio | (1) | (2) |
| 45% NaOH | 2 hr | 1:1 | Tap water | 2.0 | 6.2 | 55 | 0:1 | 40 | 8:1 | 72.9 | 89.3 |
| None | None | None | Dist. water | 2.0 | 6.2 | 55 | 0:1 | 40 | 8:1 | 53.1 | 84.9 |
| Conventional distillation | do | do | None | None | 5.6 | 55 | 5:1 | 40 | 8:1 | | 74.7 |

1 Yield of purer than C. P. acetone based on 5% cuts in which acetone had a permanganate stability of 120+ minutes.
2 Yield of C. P. acetone based on blending cuts to give maximum yield of C. P. acetone.

These results clearly show the decided improvement in yield of C. P. acetone or yield of purer than C. P. acetone obtained through the process of this invention as compared with the two other means of operation.

EXAMPLE II

A further comparison was made of the process of this invention utilizing optimum conditions with only "water extractive distillation" also utilizing optimum conditions for the latter. The results are presented below.

TABLE 5

*Comparison of optimum caustic pre-treat water extractive distillation with optimum water extractive distillation for purifying crude acetone*

| Pre-treat | | | Extractive distillation column | | | | | Product column | | C. P. acetone yield based on weight of acetone in crude |
|---|---|---|---|---|---|---|---|---|---|---|
| Solution | Contact time | Vol. ratio caustic solution to feed | Solvent | Volumetric solvent to feed ratio | Heads, vol. per-cent of feed | Number of plates | Ext. reflux ratio | Plates | Ext. reflux ratio | |
| None | None | None | Tap water | 17.5:1 | 3.0 | 55 | 0:1 | 70 | 8:1 | 93.5 |
| 35% NaOH | ½ hr | 1:2 | do | 5.2:1 | 3.1 | 55 | 0:1 | 70 | 8:1 | 96.9 |

Two points should be noted. The yield of C. P. acetone obtained from the process of this invention was superior. This superiority was obtained despite the fact that a solvent to feed ratio of 3 to 4 times greater was employed in the straight "water extractive distillation" process as compared to the process of this invention. Thus, despite the much greater cost of the former, the results, if anything, were inferior.

It will be understood further that the foregoing examples have been given merely for purposes of illustration, but that other modifications of the invention are possible without departing from the scope of the claims.

What is claimed is:

1. A process for purifying acetone in a crude feed containing predominantly acetone and a minor but significant proportion of carbonyl impurities including mesityl oxide and aldehydes, said feed being difficult to purify by conventional distillation, which comprises the steps of treating the crude feed with an aqueous caustic solution containing about 30-45 weight per cent caustic for a time of fifteen minutes to three hours with an aqueous caustic to feed ratio of 2/1 to 1/10; feeding the caustic treated mixture to a fractional distillation zone at an intermediate point thereof; continuously adding water to the fractional distillation zone substantially above the feed point of the mixture to maintain a volumetric solvent to feed ratio in the range of 2-8/1; distilling from said distillation zone a vaporous mixture ascending countercurrent to the liquid water internal reflux; removing from the distillation zone a distillate comprising a predominant proportion of water containing substantially all the carbonyl impurities and some acetone, and withdrawing as a bottoms fraction from the fractional distillation zone acetone and water, free of carbonyl impurities.

2. The process of claim 1, including the additional step of distilling the bottoms fraction withdrawn from the fractional distillation zone so as to take overhead a pure acetone fraction.

3. The process of claim 1 in which the vaporous mixture distilled from the distillation zone contains from 2 to 10 volume per cent organic matter based on the organic matter present in the original crude feed.

4. The process of claim 1 in which the carbonyl impurities are lower and higher boiling than the acetone.

WILLIAM G. EMERSON, JR.
JOSEPH R. QUELLY.

References Cited in the file of this patent

UNITED STATES PATENTS

| Number | Name | Date |
|---|---|---|
| 2,238,016 | Downey | Apr. 8, 1941 |
| 2,254,615 | McAllister | Sept. 2, 1941 |
| 2,485,615 | Steele et al. | Sept. 2, 1941 |
| 2,533,754 | Ballard | Dec. 12, 1950 |
| 2,575,244 | Carlson | Nov. 13, 1951 |
| 2,615,812 | Kauffman | Oct. 28, 1952 |
| 2,624,699 | Joris | Jan. 6, 1953 |